United States Patent [19]

Blalock

[11] 4,223,398
[45] Sep. 16, 1980

[54] METHOD FOR ACOUSTIC SIGNAL DETECTION

[76] Inventor: Sammy E. Blalock, Duncan, Okla.

[21] Appl. No.: 937,251

[22] Filed: Aug. 31, 1978

Related U.S. Application Data

[63] Continuation-in-part of Ser. No. 831,295, Sep. 7, 1977, abandoned.

[51] Int. Cl.³ .............................................. G01V 1/40
[52] U.S. Cl. .................................... 367/34; 367/26; 367/27; 181/103
[58] Field of Search ..................... 367/26, 27, 34, 127; 324/83 D, 181, 186; 364/422; 181/103

[56] References Cited

U.S. PATENT DOCUMENTS

| | | | |
|---|---|---|---|
| 2,963,646 | 12/1960 | Hicks et al. | 324/186 |
| 3,153,237 | 10/1964 | Lakatos | 343/105 R |
| 3,289,157 | 11/1966 | Brokaw | 367/127 |
| 3,322,229 | 5/1967 | Smith | 367/27 |
| 3,340,955 | 9/1967 | Gollwitzer | 367/34 |
| 3,416,080 | 12/1968 | Wright et al. | 324/186 |
| 3,437,834 | 4/1969 | Schwartz | 367/34 |
| 3,900,824 | 8/1975 | Trouiller et al. | 367/26 |
| 4,040,001 | 8/1977 | Vivet et al. | 367/34 |
| 4,042,907 | 8/1977 | Trouiller et al. | 181/103 |

Primary Examiner—Nelson Moskowitz

[57] ABSTRACT

The disclosure relates to a method and apparatus for acoustic signal detection, adapted for use in acoustic velocity well logging to measure the difference in transit times of an acoustic signal between a transmitter and two or more receivers. In a preferred embodiment of the present invention two timing measurements of the signal arriving at each of two receivers may be made by activating zero crossing detectors at the arrival of the first negative and first positive half-cycles at each receiver. A transit time is calculated from the zero crossing times following the first negative half-cycle. This first transit time may be checked for accuracy by comparing the first transit time with a second transit time calculated from zero crossing times following the first positive half-cycles, by comparing the first transit time to a previously measured transit time and/or by detecting the order of arrival of the negative and positive half-cycles to determine whether the half-cycles have been detected out of sequence at either receiver. Should the first transit time be determined to be inaccurate, the previously measured transit time or the second transit time may be substituted therefor.

16 Claims, 6 Drawing Figures

METHOD FOR ACOUSTIC SIGNAL DETECTION

RELATED APPLICATIONS

This application is a continuation in part of application Ser. No. 831,295, filed Sept. 7, 1977, entitled "Method for Acoustic Signal Detection", now abandoned.

BACKGROUND OF THE INVENTION

The present invention relates to velocity well logging of the acoustic type and particularly to such well logging by a process or system which involves lowering the acoustic well logging probe into a borehole in an earth formation to be investigated and measuring of the transit time of acoustic waves between points in the formation.

It is common practice to measure the difference in travel time of the compressional portion of an acoustic wave between a transmitting transducer or transmitter of acoustic waves and, for example, two receiving transducers or receivers positioned at predetermined different spacings from the transmitter in the well logging tool or probe. Successive acoustic signal pulses or waveforms are generated by the transmitter and travel through the borehole fluid to the formation, through the formation, and then back through the fluid to the receivers spaced along the probe to generate electrical signals in the receivers. Each of these electric signals consist of undesired baseline noise in addition to an electrical analog of the acoustic wave received from the transmitter. The latter is made up of a succession of wave arrivals, signal parts or half-cycles. The desired information is in the time of arrival of the parts or half-cycles. The earlier the arrival or half-cycle, the less is the possibility of error due to distortion or arrivals from multiple paths through the formation.

A common arrangement for determining the time of arrival of the acoustic waves at the receivers involves use of detection circuits for the receiver signal waves, which circuits discriminate in accordance with signal amplitude, in an effort to identify the same signal arrival or part in the signal generated in each receiver from each succeeding acoustic signal. This type of arrangement is usually provided with adjustable bias control so that adjustment may be made to trigger the signal arrival detection circuitry above the noise level as operating conditions very. However, raising the trigger amplitude for such circuitry above the baseline or zero value can introduce errors into the measurement if the amplitude of the detected arrivals that are employed in the measurements are not the same. Thus, if one arrival or half-cycle portion has a greater amplitude than a corresponding arrival or half-cycle signal portion crossing the zero potential base line at the same time, the former arrival or half-cycle signal portion will attain the trigger amplitude at an earlier corresponding time in the half-cycle than the latter. This condition is known as "waveform stretch" and can cause a discrepancy of up to about four microseconds in the measured arrival time in a system employing commonly used frequencies and acoustic pulse rates. This type of system also has the disadvantage in that dropping of the amplitude of a particular waveform portion or half-cycle in the signal from one receiver below the trigger threshold results in missing entirely that half-cycle, while the corresponding amplitude in the corresponding half-cycle in the other receiver does not drop, and thus is detected, introducing a measuring error known as "cycle skip". Such "cycle skip" can cause an error either reducing or increasing the measured time depending upon which receiver half-cycle is misused. Such error may amount to up to about 30–35 microseconds in a conventional system. If the trigger amplitude of the detecting circuitry is lowered too close to the baseline to avoid the other measuring errors, the circuitry could trigger on "noise" in the received signals to introduce another type of serious error in the measurements.

In one type of an acoustic well logging system, such as disclosed in U.S. Pat. No. 2,963,646 to Hicks et al, transition points in the received signal waves, such as the zero crossing transition point, are used as indications of the time of arrival of acoustic waves at the receiver. The system involves arranging for a gating circuit to respond to the second arrival or half-cycle of the acoustic-responsive signal in a receiver to provide a gate pulse for a period of time including the time of zero crossing between the second half-cycle and the third half-cycle of the received signal wave. Additionally, a short pulse is produced in response to the occurrence of the aforementioned zero crossing. The two pulses are applied to a coincidence circuit to provide an operating signal which starts operation of a monotonically varying function generator at the time of zero crossing. Similarly, a second operating signal indicative of the time of the corresponding zero crossing of the signal in the second receiver is operative through a blocking oscillator and additional circuitry to obtain the amplitude of the function generator output for recording. This system follows what the patent states is the usual practice of using the second half-cycle of the receiver signal wave to condition the measuring circuitry because this half-cycle is usually of larger magnitude than the first pulse and hence easier to track.

Another prior art acoustic well logging system uses the previously discussed procedure of detecting points where signal wave amplitude reaches a threshold value as an indication of time of arrival, but compares the difference in measured arrival times at two receivers in two succeeding measurement sequences. This system, disclosed for example, in U.S. Pat. No. 3,900,824 to Trouiller et al applies a substitute valid time value obtained in a previous measuring sequence to the recorder in place of the difference in arrival times measured in the current sequence if the latter difference varies from the difference determined in the preceding sequence by more than a predetermined amount.

The present invention takes into consideration that the earlier arrivals or half-cycles of an acoustic signal at a receiver furnish a more accurate indication of travel time of the acoustic wave from the transmitter than later arrivals or half-cycles. It also recognizes that apparatus for measuring the earlier arrivals is more likely to provide invalid time measurements than apparatus for measuring later arrivals or half-cycles. A novel and unobvious method and apparatus are disclosed for using time measurements involving earlier arrivals or half-cycle signals at acoustic well logging receivers for measuring sequences where such measurements are valid; substituting other measurements, such as those obtained from generally less accurate but more reliable (more likely to be valid) later arrivals or half-cycles; for measuring sequences where invalid results are obtained in the effort to use the earlier arrivals. Moreover, in embodiments of the present invention the sequence of arrival of the first detected positive and negative half-cycles at each receiver are compared to reduce the chance of error due to cycle skip.

It is thus an object of the present invention to provide a novel and improved method and apparatus for acoustic well logging wherein transition points occuring in corresponding early arrivals or parts of signal waves in two receivers are utilized only if the difference in time therebetween meets a standard indicative of a possible valid measurement.

It is another object of the invention to provide a novel method and system of acoustic well logging wherein determinations of arrivals of signal waves of two receivers are made at what are deemed to be two corresponding sequential sets of points and the determination made from the set earlier in sequence is utilized only if found to be valid.

It is yet another object of the invention to provide a novel method and system of acoustic well logging wherein determinations of zero crossing points of signal waves of two receivers are made at two sets of sequential corresponding points and the set which appears in the earliest parts of the waves that is truly representative of the corresponding zero crossings is recorded.

These and other objects and features of the present invention will become apparent from the following drawings and detailed description of the preferred embodiments of the present invention.

THE DRAWINGS

Figure 3:
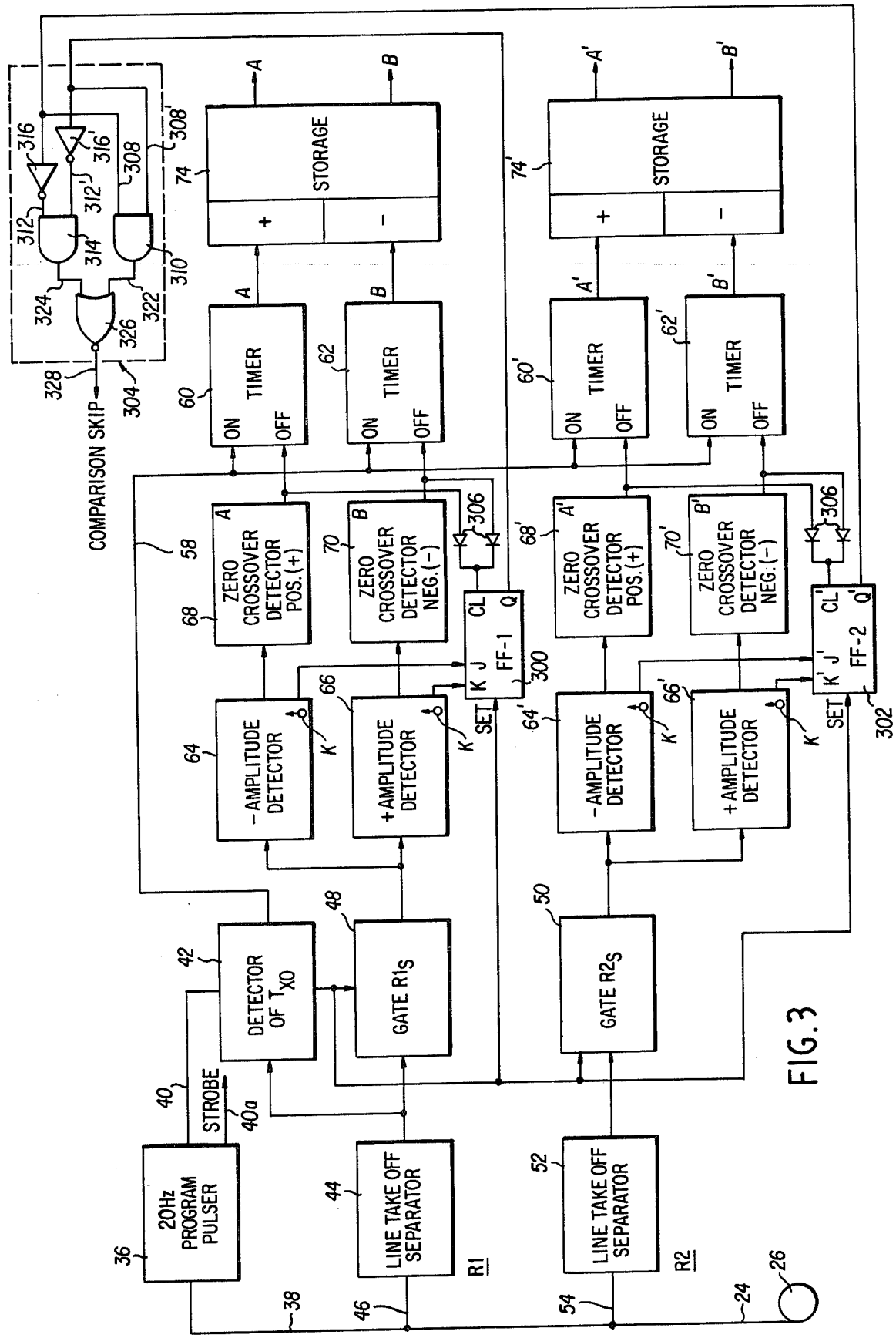
Figure 4:
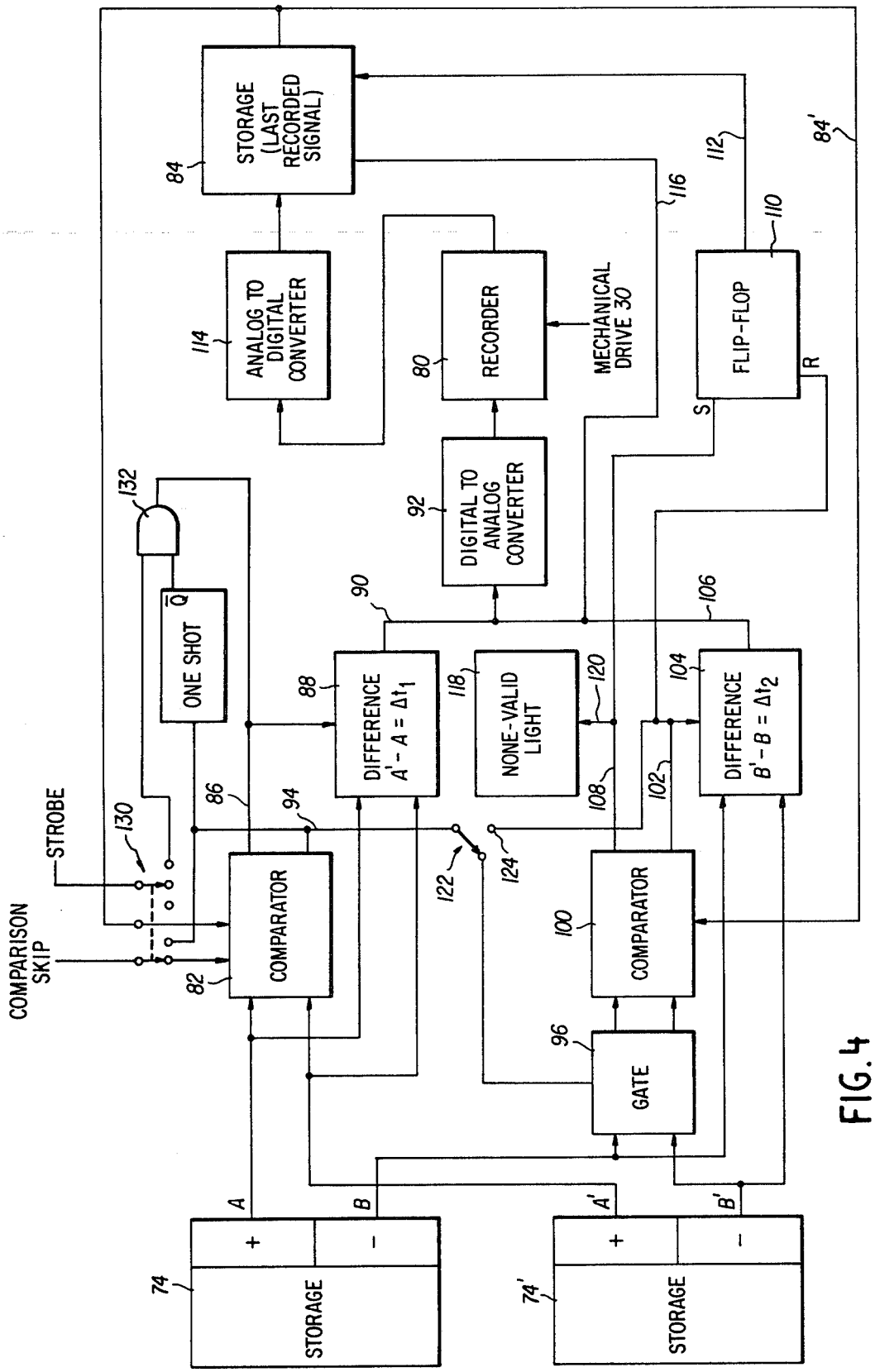
Figure 4A:
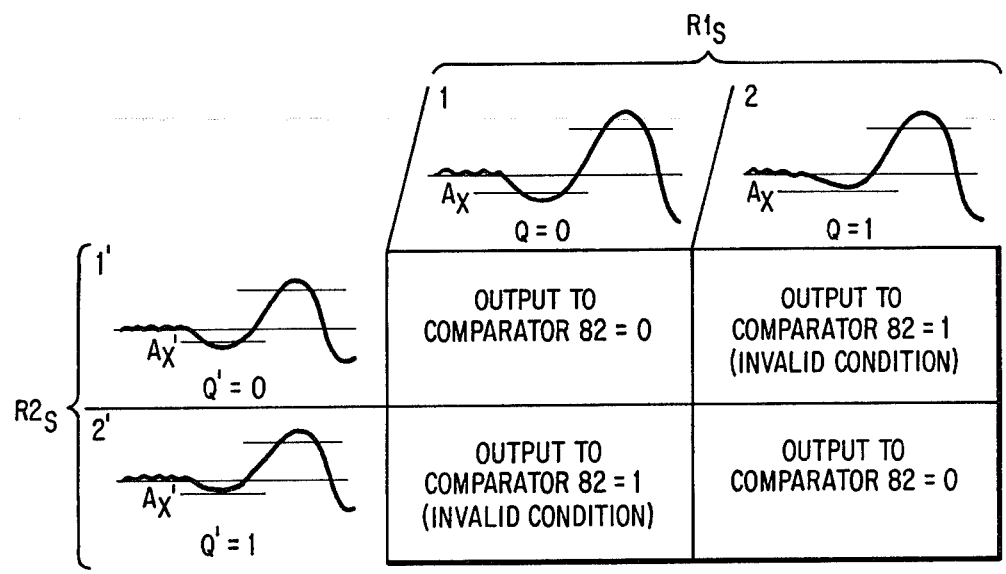

FIGS. 3 and 4 together constitute a schematic view of an electrical circuit for providing a recording of the results of acoustic well logging in accordance with the invention, and, FIG. 4a is a truth table for a sequence of arrival detection circuit portion of the electrical circuit of FIGS. 3 and 4.

Figure 5:
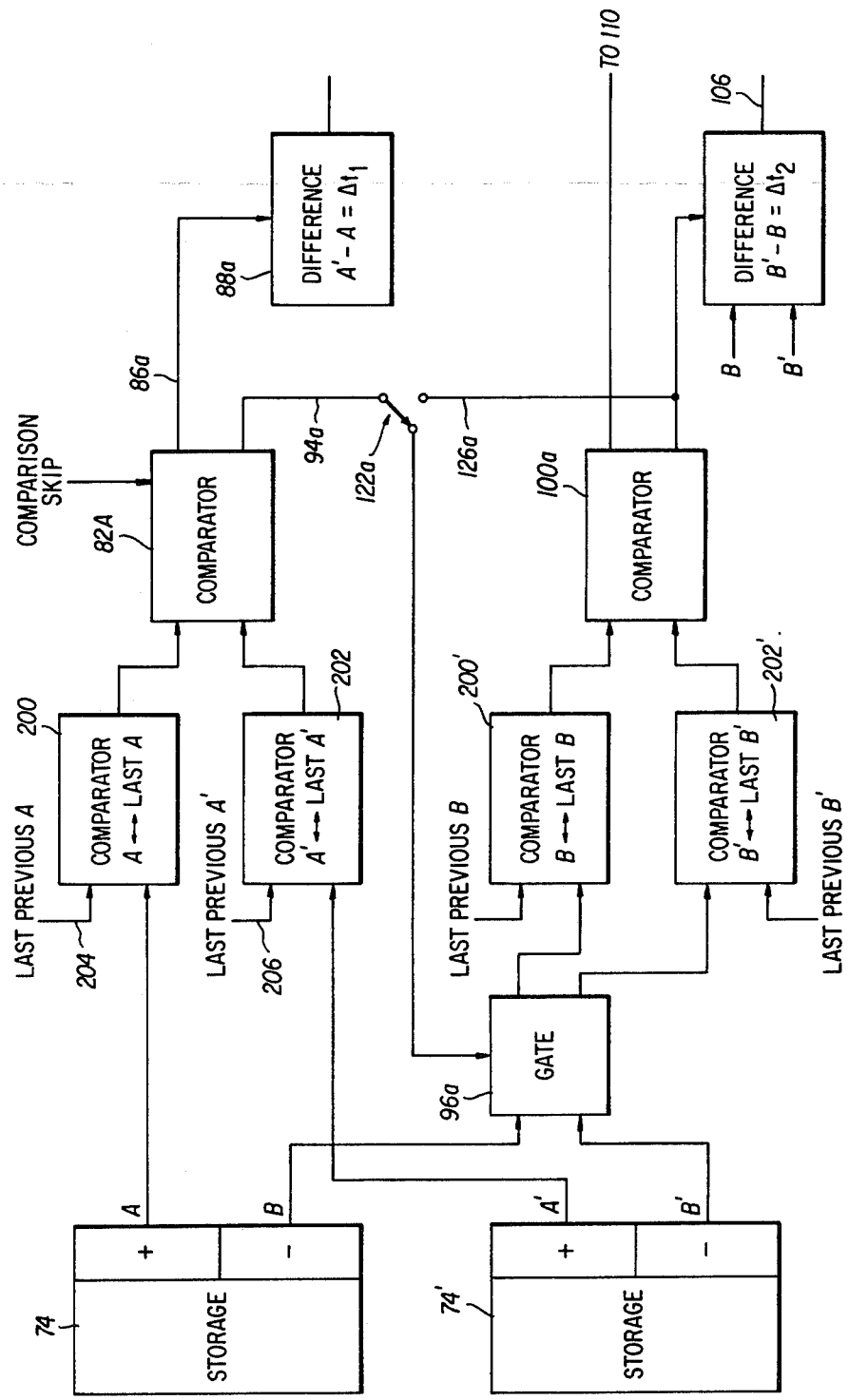

FIG. 5 is a schematic view of a modification of a portion of the electrical circuit of FIG. 4.

DETAILED DESCRIPTION

Figure 1:
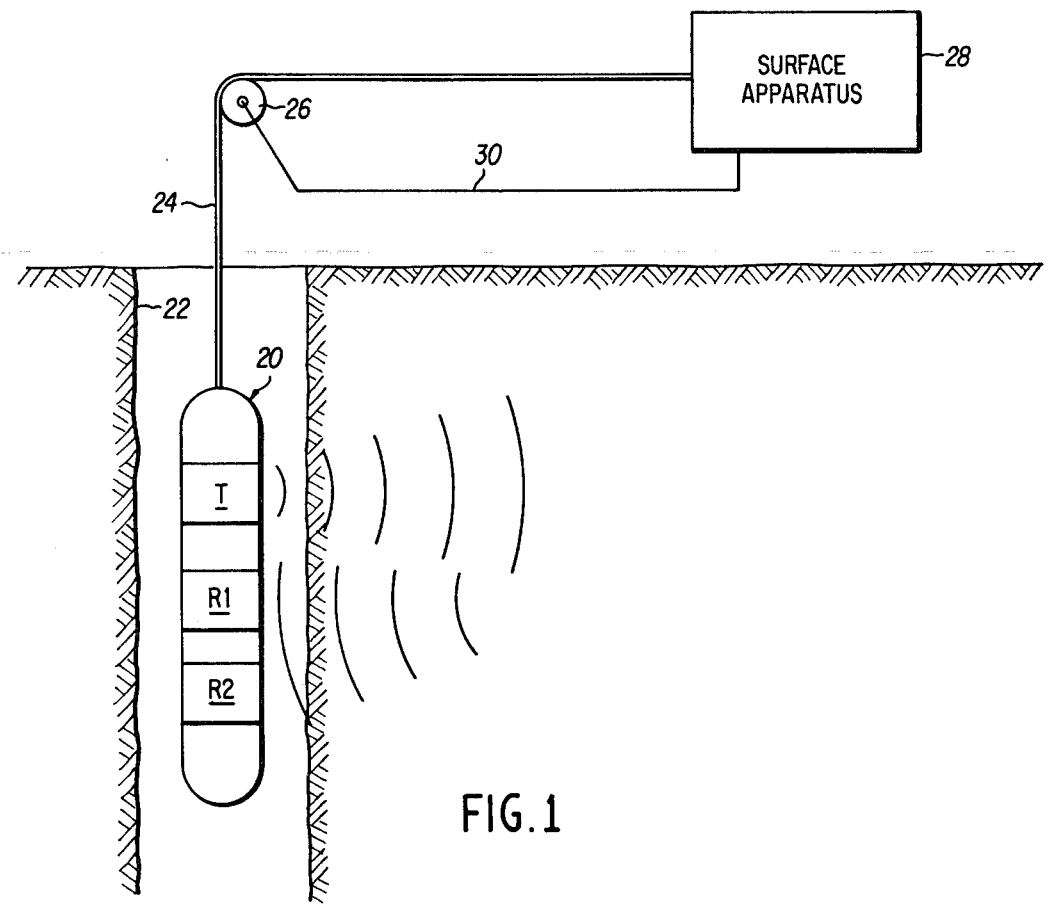
FIG. 1 is a diagrammatic view in elevation of acoustical well logging equipment for use in the present invention including a probe lowered into a borehold traversing the earth formation to be studied.

In FIG. 1, a well logging probe 20 is shown lowered by an electrical cable 24 into a borehole 22 in the formation to be studied. The cable 24 passes over a measurement pulley 26 and is connected to surface apparatus 28. A mechanical connection 30 may be provided between the measurement pulley 26 and surface apparatus 28 to provide for recording information produced by the probe 20 as a function of the depth of the probe in the borehole. Also an electro-mechanical drive such as a selsyn system may be used. The logging probe 20 is of the acoustic velocity type comprising a transmitting transducer or transmitter T, and two receiving transducers or receivers R1 and R2, spaced predetermined distances from each other and from the transmitter T. Acoustic energy, e.g., at a frequency of 5,000 to 100,000 Hz may be provided in pulses at a rate of about 5 to 40 Hz and of a predetermined duration from transmitter T in response to synchronized electrical pulses applied thereto. These acoustic pulses travel, by way of fluid in the borehole 22 and the earth formation adjacent the borehole to the first and second receivers R1 and R2. At the time of detection of the acoustic pulses in the receivers, electric signals or signal waveforms are generated in the receivers and applied by conductors in cable 24 to the surface apparatus for measurement of the arrival of pulses in the receivers as an indication of the velocity of travel of the acoustic pulses in successive portions of the earth formation traversed thereby as the probe is moved in the borehole. The conductors leading from the receivers R1 and R2 through the cable 24 are also provided with pulse waves indicative of the times of pulsing of the transmitter T. For the purposes of this discussion, it is assumed that the receivers R1 and R2 are constructed such that the first pulse received will be a negative pulse. It will be understood by those skilled in the art that receivers R1 and R2 could be constructed such that the first pulse received would be a positive pulse.

Figure 2:
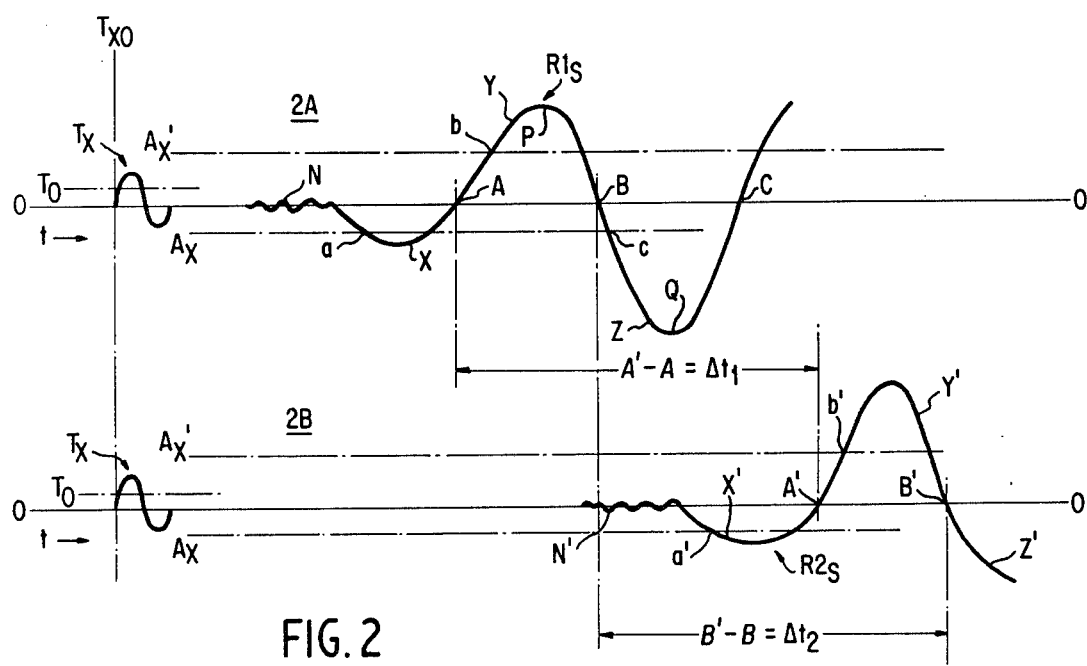
FIG. 2 is a diagram of different signals produced from the apparatus of FIG. 1 with the signal waves from the two receivers designated 2A and 2B.

FIG. 2 represents diagrammatically along a time axis t the signal waves introduced in the receivers R1 and R2 by arrivals of the acoustic waves, which waves are conducted to the above-ground apparatus 28 of FIG. 1. The upper waveform or signal wave 2A represents the output from the receiver R1 closest to transmitter T and waveform or signal wave 2B the output from the receiver R2. Signal $T_x$ shown on both 2A and 2B at the same point in time, is a pulse representative of the time of application of each synchronized actuating pulse to the transmitter T to produce the acoustic pulse. This signal $T_x$ is not subjected to any attenuation by the formation and therefore is sharp and precise and easy to detect at the surface to determine starting point to $T_{xo}$ for initiation of time measurements. The signal waves generated upon receipt of the acoustic wave by the receivers R1 and R2 are presented by $R1_s$ and $R2_s$, respectively. These signal waves are subject to attenuation because of their travel through the formation. Also the signal waves received from the receivers include noise signals N which are subjected to variations in amplitude as discussed hereinabove. It will be understood that conventional amplifying equipment for the various signals, such as the transmitter pulse synchronizing signal and the receiver signal waves, may be provided in the probe 20, at the surface, or at both locations in accordance with conventional practice.

Considering the concept of the invention in connection with FIG. 2, it will be seen that two alternative indications of the relative time of arrival of signal waves at the receivers R1 and R2 may be obtained. Thus amplitude detection means may be adjusted to a first threshold bias $A_x$ (on both 2A and 2B). This threshold bias is assigned a value low enough to ordinarily activate detector means on the first negative half-cycles X at X' at a and a', respectively, of the received signal waves to activate a transition point detector circuit. As used herein the words "transition point" refer to zero crossings such as points A and B or wave crest points such as points P and Q. In a preferred embodiment the transition point detector circuits are zero crossing detector circuits which determine the first zero crossing points A (on 2A) and A' (on 2B). These points in which the wave form changes from a negative to a positive value are commonly designated "positive" zero crossing points. Conversely, points in which the wave form changes from a positive to a negative value as designated "negative" zero crossing points. The negative or positive characteristics of a zero crossing point are sometimes referred to herein as the "polarity" of the zero crossing point.

The time differential between the occurrence of the positive zero crossing points A and A' is given by A'−A=Δt, which is representative of the time differential between arrivals of signal waves R1$_s$ and R2$_s$. Also, detector means are provided biased to a threshold value A'$_x$ (on both 2A and 2B) which is shown as of greater amplitude and opposite polarity relative to the first threshold bias A$_x$. The threshold bias A'$_x$ thus is adapted to actuate detector means at points b and b' to activate zero crossing detectors at negative zero crossing points B and B', respectively. Thus, B'−B=Δt$_2$ is also representative of the time differential in the arrival of the same acoustic pulse at receivers R1 and R2. Since the earliest arrivals or half-cycles of the received waves are most accurate, their use in recording the arrival times is preferred. However, the first half cycles of the waves are generally of low amplitude compared to the second half-cycle. Thus lower amplitude threshold bias A$_x$ setting of the detectors for crossover points A and A' makes it more likely that errors as, for example, the aforementioned "cycle skip" or "noise" response will occur, with the result that one or both of the crossing points A and/or A' may not be truly detected and what is measured as A'−A=Δt, is not valid. For example, a high amplitude noise signal might cause the threshold detector to activate the A zero crossing detector so that the latter detects a positive crossing prior to A. As another example, the first half cycle X (FIG. 2, part 2A) may not attain the threshold amplitude A$_x$ until the time represented by c on half-cycle Z and the zero crossing detector would be actuated at crossing point C. If the first half-cycle X at the first receiver does not attain the threshold, but if the half-cycle X' at the second receiver does, the result may be that the zero crossings will be detected at B and C at the first receiver and at A' and B' at the second receiver, thereby introducing error into the measurements.

Because of the possibility that the time value measured as A and/or A', and with it any value determined as A'−A=Δt, will be invalid, a test or comparison for validity is made in a suitable manner as discussed hereinafter. If the test indicates that a valid value of A'−A=Δt, has not been obtained, the value B'−B=Δt$_2$, which is less likely to be invalid although it is ordinarily less accurate, may be recorded as the current reading without further testing. Alternatively, a test similar to that used with regard to A and A' may be applied to B and B'. If the latter test further indicates that a valid value of B'−B=Δt$_2$ will not be obtained, a value corresponding to the last recorded value measurement may be recorded as the current measurement. In order to prevent errors caused by missed half-cycles, when the half-cycle X or half-cycle X' does not attain the threshold A$_x$, logic circuitry may be provided to determine the order of detection of the first negative and positive half-cycles at each receiver, and to select either the first positive zero crossings in each of the waveforms R1$_s$ and R2$_s$ or the first negative zero crossings for use in calculating Δt.

FIG. 3 shows a portion of a surface apparatus suitable for determining the zero crossing points A, A', B and B' of FIG. 2 and for storing representations of such times for use in making the necessary further determinations and recordings. A pulser or programmer 36 which may operate at a 20 Hz rate to pulse the transmitter T is connected through a conductor means 38 to cable 24 and through line 40 to T$_{xo}$ detector 42. A line take off separator 44 is energized from cable 24 through line 46 with a composite signal 2A including the transmitter synchronized signal T$_x$, indicating the time the transmitter begins each acoustic pulse, and the signal R1$_s$ produced from receiver R1 (FIG. 2). The separator 44 impresses this signal, with any undesired power signals or the like removed, on the input of detector 42. The detector 42 is biased to respond to the transmitter-synchronized signal T$_x$ attaining preselected amplitude T$_o$ to produce a gating signal at time T$_{xo}$, used as the base or starting time for the time measurements. The detector 42 is connected to gate 48, which also receives the signal from R1 through separator 44, and to a second gate 50. Gate 50 is connected to a line take off separator 52 which receives the composite signal from the second receiver R2 through conductor 54 in cable 24. Detector 42 also has its output connector to a conductor 58 for connection to the ON terminals of timers of clocks 60, 62, 60' and 62'. These timers, upon being turned on by detector 42 at time T$_{xo}$, commence counting pulses of a frequency, preferably a substantial multiple of the acoustic frequency of about 20,000 to 30,000 Hz.

Additionally, the output of gate 48 is connected to the inputs of negative (−) and positive (+) amplitude detectors 64 and 66 respectively, to pass the signal wave from R1, including R1$_s$, thereto. Detector 64 is biased to respond to the occurence negative amplitude A$_x$ on the X portion of the first half-cycle of signal wave R1$_s$ (FIG. 2) to prepare a zero crossing detector 68 for operation. Similarly, detector 66 is biased to respond to the occurence of a positive amplitude A'$_x$ on the Y portion, or second half-cycle, of the R1 receiver signal R1$_s$. The detector 66 operates to prepare a zero crossing detector 70 for operation. Referring additionally to FIG. 2, actuation of amplitude detector 64 at a during the first half of half-cycle X of R1$_s$ results in actuation of crossing detector 68 at the next (positive) zero crossing point A or signal wave R1$_2$. The output signal from zero crossing detector 68 in turn is applied to OFF terminal of timer 60 to discontinue its counting at a reading indicative of the time that has elapsed since the detection of the transmitter pulse synchronized signal by detector 42 at zero time point T$_{xo}$. Similarly, actuation of amplitude detector 66 at b during the first half of the second half-cycle Y of signal R1$_s$ results in actuation of detector 70 at the next (negative) zero crossing point B on signal wave R1$_s$. It will be noted that substantially the same biasing amplitudes A$_x$ and A$_x$' are used for the pairs of detectors 64 and 64' and 66 and 66', respectively. When actuated as stated, zero crossing detector 70 applies its output signal to the OFF terminal of timer 62 to discontinue its counting at a reading indicative of the time that elapsed between zero time point T$_{xo}$ and negative zero crossing point B.

The signal from receiver R2 from conductor 54 in cable 24 is treated similarly to the signal from R1 as just discussed. Thus, gate circuit 50 operated by detector 42 at time T$_{xo}$ to allow the signal wave R2$_s$ to pass to negative and positive amplitude detectors 64' and 66', respectively. These amplitude detectors respond to attainment of threshold voltage values A$_x$ and A$_x$' (FIG. 2) by the signal from R2 at points or times a' and b' to condition zero crossing detectors 68' and 70' for operation on the next zero crossing points A' and B', respectively, on signal wave R2$_s$. The outputs from detectors 68' and 70' are connected to OFF terminals of timers 60' and 62' to stop the counts thereof at values representative of the the time expired between $T_{xo}$ and A' and B', respectively.

The timers 60 and 62 act to store the counts therein when the OFF signals representative of the positive (+) and negative (−) zero crossings are impressed thereon in storage circuit or register 74. Timers 60' and 62' similarly store the counts arrived at therein at the positive and negative zero crossings in a storage circuit 74'. The timer circuits 60, 62, 60' and 62' may be arranged in any suitable conventional manner to be returned to initial zero condition upon their counts being transferred to the storage circuits 74 and 74', whereby the timers are conditioned for the treatment of succeeding signals resulting from the next acoustic pulse produced by the transmitter T. Known alternative arrangements may be employed for conditioning the timers including circuitry operated from pulses of the program pulser 36.

The relative order of detection of the first negative and positive zero crossings may be determined by flip flops 300 and 302, connected to logic circuit 304. A set input terminal of each flip flop is connected to the detector 42. The K input terminal of the first flip flop 300 is connected to the positive amplitude detector 66, and the J input terminal of the first flip flop is connected to the negative amplitude detector 64. Corresponding inputs K' and J' of the second flip flop 302 are connected in a similar manner in the positive and negative amplitude detectors 66' and 64'. The clock input terminals CL and CL' of the flip flops are connected to the positive and negative zero crossing detectors 68 and 70, and 68' and 70', respectively, through diodes 306.

The Q and Q' output terminals of the first and second flip flops 300 and 302 are connected to the logic circuit 304. Specifically, the output terminal Q of the first flip flop 300 is directly connected to a first input terminal 308 of a first AND gate 310, and is also connected to a first input terminal 312 of a second AND gate 314, via an inverter 316. The output terminal Q' of the second flip flop 302 is connected to the logic circuit 304 in a similar fashion.

An output terminal 318 of the first AND gate 310 and an output terminal 320 of the second AND gate 314 are respectively connected to input terminals 322 and 324 of a NOR gate 326. A logic signal, referred to hereinafter as the "COMPARISON SKIP" signal, is provided at an output terminal 328 of the NOR gate 326 and may be applied to the circuitry shown in FIG. 4 or 5.

The operation of the flip flops 300 and 302 and the logic circuit 304 will now be described in connection with the truth table shown in FIG. 4a. The table shows two possible variations of the signal $R1_s$ received at the first receiver: one variation (1) in which the first negative half wave attains the threshold $A_x$ and a second variation (2) where it does not. It will be apparent from examination of the interconnection of the first flip flop shown in FIG. 3 that the first variation (1) may produce a logic zero at the Q output while the second variation (2) may produce a logic one at the Q output. Similar variations of the signal $R2_s$ are shown along the vertical axis of the truth table of FIG. 4a.

As shown in FIG. 4a, the logic circuit produces a logic zero whenever the first negative half-cycle is detected in both $R1_s$ and $R2_s$, and whenever the first negative half-cycles are missed in both $R1_s$ and $R2_s$. Conversely, the logic circuit produces a logic one (COMPARISON SKIP signal) whenever the first negative half-cycles detected in $R1_s$ do not correspond. These conditions are invalid since timing measurements made from subsequent zero crossings would be erroneous.

Considering FIG. 4 in connection with FIGS. 2 and 3, it will appear that the storage units 74 and 74' store values representative of the times of receiver signal zero crossing times A, B, A' and B', all related to the same zero time point, assuming that the amplitudes of the signals during the acoustic pulse sequence currently under consideration, including the noise signals N, have fallen within the anticipated ranges on which selection of threshold $A_x$ and $A_x'$ was based. Under these circumstances, two sets of valid indications, proportional to the difference in arrival times of the current acoustic pulse at receivers R1 and R2 and inversely proportional to the velocity of travel of the pulse, are available from the information in the storage units. Thus, $A' - A = \Delta t_l$ is indicative of the difference in zero crossing times between the earliest half-cycles X and Y on one hand and X' and Y' on the other (FIG. 2). Also, $B' - B = \Delta t_s$ is indicative of the difference between the zero crossing times between the succeeding half-cycles Y and Z and Y' and Z'. The circuitry set out in FIG. 4 is designed to test the value believed to be $A' - A$ to determine if it is valid, because that value is the more accurate, and to use that value, if valid, in recording the results for the corresponding acoustic pulse sequence. If the value $A' - A$ is not valid, attention is then directed to the value $B' - B$. While $B' - B$ is ordinarily less accurate than $A' - A$, it is less liable to be invalid because the greater amplitude, which is regarded as characteristic of the half-cycle Y, makes it easier to assure that the value is true or valid, as by using a higher threshold for the amplitude detectors. If one or both of the zero crossings A and A' are mixed because the amplitude of the first positive half-cycles X and X' do not attain the threshold values, or if the value of $A' - A$ exceeds a predetermined derivation from a previous transit time measurement, the value $B' - B$ may also be tested for validity. If that value also is not valid, an alternative possible value may, for example, be a repeat of the last value previously recorded as valid.

More specifically, FIG. 4 shows a comparator 82 connected to receive the signals representative of the positive crossing times A and A' from storage units 74 and 74'. The comparator 82 determines the difference $A' - A$ and compares that value with reference value related to a value representative of what is deemed a possible or generally likely value to be expected for the test conditions. A preferred reference value may be one representative of the last value recorded as valid. Such a value is stored in a storage unit 84 and is shown applied as an input to comparator 82 in FIG. 4. If the absolute difference between $A' - A$ and the reference threshold value is less than a predetermined amount selected, for example, between 65% and 75% of average period of the acoustic waves, the value being tested is regarded as valid and the comparator 82 applies a gating signal through line 86 to a difference circuit 88.

The output signal of the logic circuit 304 of FIG. 3 may be applied to the comparator 82 as shown in FIG. 4. A logic 1 (COMPARISON SKIP signal) applied to the comparator 82 may cause a signal to be applied to output terminal 94 to reject the $A' - A$ determination and permit the determination of $B' - B$.

If $A' - A$ tests valid and no COMPARISON SKIP signal is produced, the difference circuit receives the stored positive crossover values A and A' and, upon receipt of the gating signal through line 86, it applies the difference A'−A through a line 90 to a digital-to-analog converter 92. The output of converter 92 is applied to recorder 80 for recording as a function of the position of the acoustic probe 20 in the bore-hole as represented by a mechanical drive 30 (see FIG. 1).

In the case the absolute difference measured is not less than the preselected absolute difference value or the COMPARISON SKIP signal is produced, the comparator provides an output signal to line 94 instead of line 86. Line 94 is connected to a gate circuit 96, which circuit is connected to receive the zero crossing values B and B' from storage devices 74 and 74'. If gate 96 is operated by a pulse on line 94, B and B' are read into a comparator 100. This comparator determines the difference B'−B and compares that difference with a comparison reference value. This latter value may be the same as that discussed in connection with comparator 82, the value in storage unit representative of the last recorded value being connected to comparator 100 by line 84'. If the absolute difference between B'−B and the reference value is less than a preselected amount, such as one selected between 65% to 75% of the reference value, comparator 100 will apply a control signal through line 102 to a difference circuit 104. Difference circuit 104 responds to a signal on line 102 to determine the difference $B'-B=\Delta t_2$ and apply that difference through a conductor 106 to the digital-to-analog converter 92. The analog output of converter 92 is impressed on recorder 80 for recording as a function of the depth of the logging probe 20.

If the absolute difference detected in the comparator 100, like that detected in comparator 82 in the present example, is not less than the preselected absolute difference, the comparator 100 provides an output signal on line 108 instead of line 102. This signal on line 108 is applied to set terminal S of a one shot multivibrator or flip-flop 110, which is normally in reset condition providing no operative signal on its output lead 112. The resulting setting of flip-flop 110 by the signal on line 108 results in an output signal on line 112 being applied to storage device 84. This device 84 stores a digital signal which has been impressed thereon from the recorder 80 through an analog-to-digital converter 114 and is representative of the last signal previously applied to the recorder. Storage device 84 includes means responsive to the application of a signal applied thereto on line 112 from the flip-flop 110 to apply the stored signal through a line 115 and digital-to-analog converter 92 to recorder 80. Thus, lack of validity of both measurements A'−A and B'−B in a particular acoustic pulse sequence may result in a substitute signal being recorded as a substitute value for the current acoustic pulse sequences.

While the drawings show the last previously recorded signal value applied to comparators 82 and 100 for possible use in determining the reference value against which the measured values A'−A and B'−B are compared to determine whether the latter values differ by less than a predetermined absolute amount, it will be understood that other quantities may be used in place of the value of the last recorded signal in certain cases. Thus, a value calculated on the basis of previously determined characteristics of the formation being tested or adjacent formations may be used instead when desired. Still other types of tests indicative of whether values A'−A and B'−B will be valid will be discussed hereinafter.

A None-Valid Light 118 is preferably provided with a connection through a line 120 to the output line 108 from comparator 100. Light 118 is normally unlighted. However, the application of a signal thereto through line 108, which results only when both measurements A'−A and B'−B are found not valid, causes illumination of light 118 to warn the operator. Either a single operation of the None-Valid Light due to failure in one pulse sequence, or, more particularly, continued illumination over a plurality of sequences will indicate that changes in the circuit adjustments are probably needed if further meaningful information is to be obtained by continued logging of the borehole. Matters particularly likely to require adjustments are the threshold biases $A_x$ or $A'_x$ (FIG. 2) for the amplitude detectors 64, 66, 64' and 66'. FIG. 3 shows these amplitude detectors each to be provided with a knob K controlling, for instance, a potentiometer for varying the threshold biases. In certain cases, suitable oscilloscope equipment or the like may be applied to the circuitry in a manner that will be apparent to one skilled in the art to determine waveform conditions and thereby facilitate making such adjustments as will provide most accurate results in using the present invention.

Also, a closed loop circuit actuated from comparators 82 and 100 may be provided to automatically adjust the operating threshold of the negative amplitude detectors 64, 64' and the positive amplitude detectors 66, 66', respectively.

The description has emphasized the advantages of using the first and second zero crossing points of the received signal waves for making the A, A' and B, B' measurements. However, it may be found under certain conditions that the first half-wave of the received signals is too low in amplitude to offer most practical results with the consistency required. In such case, it is contemplated that subsequent sequential zero crossings such as the second and third such crossings will offer the most meaningful final results when used according to the novel concepts described herein.

It is further to be noted that zero crossings determined second in time, such as those at B and B', may almost invariably provide a valid, and thereby suitable, substitute for the preferred earlier crossings, as A and A', for the sequences when the differences in the latter crossings turn out to be invalid. For such circumstances, a simple two position switch 122 may be introduced in the line 94 extending from comparator 82 to gate 96 in FIG. 4. This switch may be arranged so that the connection of line 94 to gate 96 may be opened and line 94 may be connected to a contact 124 in a line 126 connected to the control terminal of difference circuit 104. The circuit 104 may be such as to respond to a signal on line 94 in the same manner already described with respect to a signal on line 102 from comparator 100. Thus, a determination by comparator 82 that the absolute difference between A'−A and the reference amount is not less than the selected predetermined amount will result in the signal B'−B from difference circuit 104 being applied in analog form to recorder 80 without further testing. Where this type of operation is desired, certain elements shown in the circuit of FIG. 4 may be omitted entirely. These elements include the gate 96, the comparator 100 and the flip-flop 110, as well as the lines connecting these elements in the circuit.

Likewise, if a COMPARISON SKIP signal is produced, there is no need for testing A'−A against a reference value since they will automatically fall outside the test limits. The COMPARISON SKIP signal will usually detect an invalid condition prior to the reference comparison test and is therefore a more positive and superior test. For this reason it may be desirable to use this COMPARISON SKIP as the only test for validity of $A'-A=\Delta t_1$. Three pole switch 130 provides a means of bypassing comparator 82 and applying the COMPARISON SKIP signal directly to line 94. In this case, a STROBE pulse is received from the output 40a of program pulser 36 shown in FIG. 3 and is applied to one input of AND gate 132. The COMPARISON SKIP signal is also switched by switch 130 and applied to the input of flip-flop 131, with the Q output of flip-flop 131 applied to the other input of AND gate 132. If a COMPARISON SKIP signal is produced from circuit 304, AND gate 132 inhibits difference circuit 88 and a signal is applied to line 94 to allow the determination of $B'-B$. If a COMPARISON SKIP signal is not received, the Q output of one shot 131 remains high, and the STROBE pulse at AND gate 132 enables difference circuit 88 to determine $A'-A=\Delta t_1$ as discussed previously.

It will be understood by those skilled in the art that this type of operation will allow comparator 82 to be omitted. If, as discussed above, comparator 100 is not desired, then flip-flop 110, storage 84 and analog to digital converter 114 may also be omitted.

The above description of FIG. 4 has described one test for validity of the value believed to represent $A'-A=\Delta t_1$. That test involves comparison of that value with a corresponding standard value, such as the last zero crossing difference recorded as valid or a calculated possible valid value of $A'-A$ for the area under investigation and for the characteristics of the measuring circuit. However, tests or comparisons may instead by made of other values, such as currently measured A and A', which will likewise give an indication of whether the value measured as $A'-A$ (or $B'-B$ when desired), is a valid one for the particular sequence involved. One such other test may involve the comparison of the A and A' values measured in the present measurement sequence with the corresponding A and A' values obtained in the last previous measurement sequence.

FIG. 5 illustrates a form of such an alternative comparison system in association with parts of the system of FIG. 4 whereby the manner of substitution of the alternative arrangement of the latter system will be apparent. In FIG. 5, the positive zero crossing signals A and A' from storage units 74 and 74' are imposed on comparison units 200 and 202, respectfully. Also imposed on comparison units 200 and 202 on conductors 204 and 206 are signals representative of the values of A and A', respectively, found during the last preceding measurement sequence. These latter values may be preserved for such application by delay circuits or auxiliary storage circuits in a manner that will be apparent to a person of ordinary skill in the art. If the current value A in comparator 200 differs from the preceding value A therein by less than a selected amount, a signal indicating a valid value of A will be applied to comparator 82A. The selected amount of difference permissable between the current and preceding values of A may be small because the speed of the movement of probe 20 is such that each subsequent measurement sequence ordinarily makes a measurement over a portion of the earth formation that includes a large part, as for example 90 percent, of that formation included in the preceding measurement sequence. Accordingly the acceptable amount of difference may be selected between about 20 to 70 percent of the average period of the acoustic signal used. In a similar manner, the comparator 202 provides a signal indicating a valid value of A' if the difference between it and the value found in the preceding measurement sequence does not exceed the preselected allowable value.

If A and A' are tested by comparators 200 and 202 and found not to exceed the preselected allowable deviation, they are applied to comparator 82A. Comparator 82A applies a signal on conductor 86a to permit the difference $A'-A$ to be determined, provided that the COMPARISON SKIP signal is not received indicating that the positive and negative zero crossings have not been received in proper sequence. If no COMPARISON SKIP signal is present, imposition of signals indicating valid values of both A and A' on comparator 82A causes this comparator to provide conductor 86a with a signal effective to cause difference circuit 88a to provide an output $A'-A=\Delta t$, for use in recording as already described. If the comparator 82A does not receive signals indicating valid values from both comparators 200 and 202, or if the COMPARISON SKIP signal is received, the comparator 86a provides a signal on conductor 94a. If switch 122a is connected to gate 96a comparators 200' and 202' test signals B and B' similarly to the testing of signals A and A' and apply signals to comparator 100a. The comparator 100a responds to the input signals to provide output signals having a similar effect to the output signals from comparator 100 of FIG. 4. If the switch 122a is connected to line 126a the presence of a signal on line 94a, will indicate that $A'-A$ is invalid, or that the positive zero crossings have been measured in the wrong sequence, and will act as before to cause a signal $B'-B=\Delta t_2$ to be employed.

While the present invention has been described most specifically in conjunction with a logging system of the type in which separate channels are employed to transmit signals to the surface, it will be understood that the invention is also applicable to systems in which receiver signals are sent to the surface over a common channel as is common in the prior art. It will further be understood that duration of the signals provided by certain elements of the apparatus must be controlled in a manner that will be readily apparent to a person of ordinary skill in the art from the above description of the apparatus and its operation to provide the desired operation over rapidly repeated series or sequences of acoustic pulses. Also, it is apparent that digital and analog phases of operation may be interchanged in certain aspects of the described apparatus. Since these matters and further details of the apparatus do not constitute essential features of the inventions, but may be in accordance with various appropriate teachings of the prior art, they are not all shown in the drawings herein to avoid needless complication thereof.

The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A method of determining acoustic transit times in an earth formation traversed by a borehole, comprising:

(a) disposing in a borehole a transmitter and first and second receivers spaced at different distances from the transmitter;

(b) transmitting a pulse of acoustic waves from the transmitter;

(c) receiving, at each receiver, a signal wave corresponding to the pulse of acoustic waves transmitted by the transmitter;

(d) detecting, at the first receiver, the times of occurrence of an early positive and an early negative zero crossing in the received signal wave, said early positive and early negative zero crossings being selected responsive to the amplitude of the received signal wave;

(e) detecting, at the second receiver, the times of occurrence of an early positive and an early negative zero crossing in the received signal wave, said early positive and early negative zero crossings being selected responsive to the amplitude of the received signal wave; and (f) determining the acoustic transit time from the times of occurrence of the earliest detected zero crossings at each receiver having the same polarity.

2. A method of measuring transit times between spaced points in an earth formation traversed by a borehole, comprising:

(a) lowering into the borehole an acoustic probe including a transmitter and first and second receivers spaced at different distances from the transmitter;

(b) emitting successive pulses of acoustic waves from said transmitter to produce signal waves in said first and second receivers;

(c) detecting when each successive signal wave in each receiver first attains a first amplitude and polarity selected for at least frequent attainment in an early half-cycle of the signal waves and producing signals representative of times of the next zero crossing in the signal received at each receiver;

(d) detecting when each successive signal wave in each receiver first attains a second amplitude of greater magnitude than said first amplitude and of opposite polarity, selected for attainment in another early half-cycle and producing signals representative of the times of the next zero crossing in the signal received at each receiver;

(e) comparing the zero crossing signals of step (c) with at least one previous measurement to determine whether the zero crossing signals lie within a range of acceptable values;

(f) determining whether the zero crossings detected in step (c) at the first receiver occurred before the zero crossing detected in step (d) at the first receiver;

(g) determining whether the zero crossings detected in step (c) at the second receiver occurred before the zero crossing detected in step (d) at the second receiver; and (h) recording a quantity representative of the difference in the zero crossing signals of step (c) as a function of the depth of the probe in the borehole if said signals are determined to lie within the range of acceptable values and both were determined in steps (f) and (g) to have occurred before the zero crossings detected in step (d) at the respective receivers.

3. The method of claim 2 further comprising the step of recording a quantity representative of the difference in the zero crossing signals detected in step (d) as a function of the depth of the probe in the borehole, if no signal is recorded in step (h).

4. A method of measuring transit times of acoustic waves between spaced points in an earth formation traversed by a borehole, comprising:

(a) lowering into the borehole an acoustic probe including transmitter means, and first and second receivers spaced at different distances from the transmitter means;

(b) transmitting a pulse of acoustic waves from said transmitter means;

(c) receiving a signal wave corresponding to the acoustic pulse at each of the first and second receivers.

(d) detecting the receipt of a half cycle of the signal wave at each receiver, having an amplitude greater than a predetermined threshold value and providing a time signal representative of the times of occurrence of the next zero crossing point of the signal wave received at each receiver following said detection of the receipts of the half cycles;

(e) detecting a subsequent half cycle at each receiver having an amplitude greater than a second predetermined threshold value and providing a time signal representative of the times of occurrence of the next zero-crossing point of the signal wave received at each receiver;

(f) comparing the time signal provided in step (d) with a previous measurement to determine whether the time signals provided in step (d) is a valid representation of the transit time between the receivers;

(g) recording said time signal provided in step (d) as a function of the depth of the probe in the borehole only if step (f) determines that the time signal is a valid representation of the transit time between the receivers; and (h) recording the time signal provided in step (e) as a function of said depth of the probe in the borehole if the performance of step (f) does not determine that the time signal provided in step (d) is a valid representation of the difference in time between corresponding zero-crossing points.

5. The method of measuring transit times of 4 wherein the first and second predetermined threshold values are of different magnitudes, the second predetermined value having a greater magnitude than the first, and wherein the zero-crossing points of step (d) are positive zero-crossing points and the zero-crossing points of step (e) are negative zero-crossing points.

6. An apparatus for measuring transit times of acoustic waves between spaced points in an earth formation traversed by a borehole, comprising:

an acoustic probe including means for transmitting a pulse of acoustic waves and first and second receivers spaced at different distances from the acoustic transmitting means for receiving a signal wave corresponding to the acoustic pulses transmitted by the transmitting means;

means for raising and lowering the acoustic probe within the borehole;

means, connected to the first receiver, for detecting when the amplitude of the signal waves received by the first receiver attains a first preselected value during a negative half wave, for providing a time signal (A) representative of the next zero crossing point in the signal wave, for detecting when the amplitude of the signal waves received by the first receiver attains a second preselected value, higher than the first, during a positive half wave, and for providing a time signal representative of the next zero crossing point (B) in the signal waves;

means, connected to the second receiver, for detecting when the amplitude of the signal waves received by the second receiver attains a third preselected value during a negative half wave, for providing a time signal (A') representative of the next zero crossing point in the signal wave; for detecting when the amplitude of the signal waves received by the second receiver attains a fourth preselected value, higher than the third during a positive half wave, and for providing a time signal representative of the next zero crossing point (B') in the signal waves;

means for testing the validity of the zero crossing time signals following the first detected negative half waves (A and A') to determine their suitability for calculating transit time between the receivers;

means for recording, as a function of the depth of the probe in the borehole a quantity representative of the difference between the zero crossing time signals following the first detected negative half waves (A'−A) when the testing means determines that said zero crossing signals are suitable; and for recording a quantity representative of the difference between the zero crossing time signals following the first detected positive half waves (B'−B) when the testing means determines that the zero crossing signals A' and A are unsuitable.

7. The apparatus of claim 6 wherein said testing means includes means for comparing the zero crossing time signals (A' and A) with zero crossing time signals provided responsive to a previous acoustic pulse.

8. The apparatus of claim 6 wherein said testing means includes means for comparing the difference between the zero crossing time signals (A'−A) with the difference between zero crossing time signals provided responsive to a previous acoustic pulse.

9. The apparatus of claim 6 wherein said testing means includes means for comparing the difference between the zero crossing time signals (A'−A) with the difference between the zero crossing time signals (B'−B).

10. The apparatus of claim 6, further comprising means for determining the order of occurrence of zero crossing signals, A and B, and the order of occurrence of zero crossing signals, A' and B', and for rejecting the time difference A'−A as a valid measurement if either A occurs before B or A' occurs before B'.

11. A method of measuring transit times of acoustic waves between spaced points in an earth formation traversed by a borehole, comprising:
  (a) lowering into the borehole an acoustic probe including a transmitter and first and second receivers spaced at different distances from the transmitter;
  (b) generating successive pulses of acoustic waves in said transmitter to produce successive signal waves in said first and second receivers;
  (c) detecting when each successive signal wave in each receiver first attains a preselected condition and providing a time signal representative of the first zero crossing point thereafter in the signal wave;
  (d) providing an indication of the difference in times between the time signals representative of said first zero crossing points in the signal waves from the first and second receivers;
  (e) determining whether said indication of the difference in times provided in step (d) differs by less than a predetermined amount from a comparison quantity representative of a possible valid value for said indication of the difference in times;
  (f) recording a quantity representative of the indication of difference in times provided in step (d) as a function of the depth of the probe in the borehole if step (e) determines that said indication of difference in times differs by less than said predetermined amount from said comparison quantity; and
  (g) recording a second quantity representative of a possible valid value for said indication of difference in times as a function of the depth of said probe in the borehole if (e) determines that said indication of difference in times does not differ by less than said predetermined amount from said comparison quantity.

12. A method of measuring transit times as recited in claim 11 wherein step (g) of recording a second quantity if step (e) determines that said indication of differences in times does not differ by less than said predetermined amount from said comparison quantity includes:
  detecting when each successive signal wave in each receiver first attains a second preselected condition and providing a time signal representative of the first zero crossing point thereafter in the signal wave; and
  providing an indication of the difference in the time signals representative of the first zero crossing points in the signal waves in said first and second receivers after attainment of said second preselected condition.

13. A method of measuring transit times as recited in claim 12 wherein said first mentioned preselected condition and said second preselected condition constitute amplitudes.

14. A method of measuring transit times as recited in claim 13 wherein a quantity representative of said indication of the difference in the time signals representative of the first zero crossing points in the signal waves in said first and second receivers after attainment of said second preselected condition is recorded as said second quantity.

15. A method of measuring transit times as recited in claim 13 wherein step (g) further includes:
  recording said indication of the difference in the time signals representative of the first zero crossing points in the signal wave in said first and second receivers after attainment of said second preselected condition as said second quantity only if said indication differs by less than a predetermined amount from a comparison quantity representative of a possible valid value for said indication of the difference in times.

16. A method of measuring transit times as recited in claim 13 wherein said comparison quantity representative of a possible valid value for said indication of the difference in times is representative of a value previously recorded as valid.

* * * * *